J. H. BULLARD.
SPEEDOMETER.
APPLICATION FILED JAN. 18, 1908.

947,788.

Patented Feb. 1, 1910.

2 SHEETS—SHEET 1.

Witnesses:
H. L. Sprague
H. W. Bowen

Inventor:
James H. Bullard
by Chapin & Co.
Attorneys.

J. H. BULLARD.
SPEEDOMETER.
APPLICATION FILED JAN. 18, 1908.
947,788.
Patented Feb. 1, 1910.
2 SHEETS—SHEET 2.
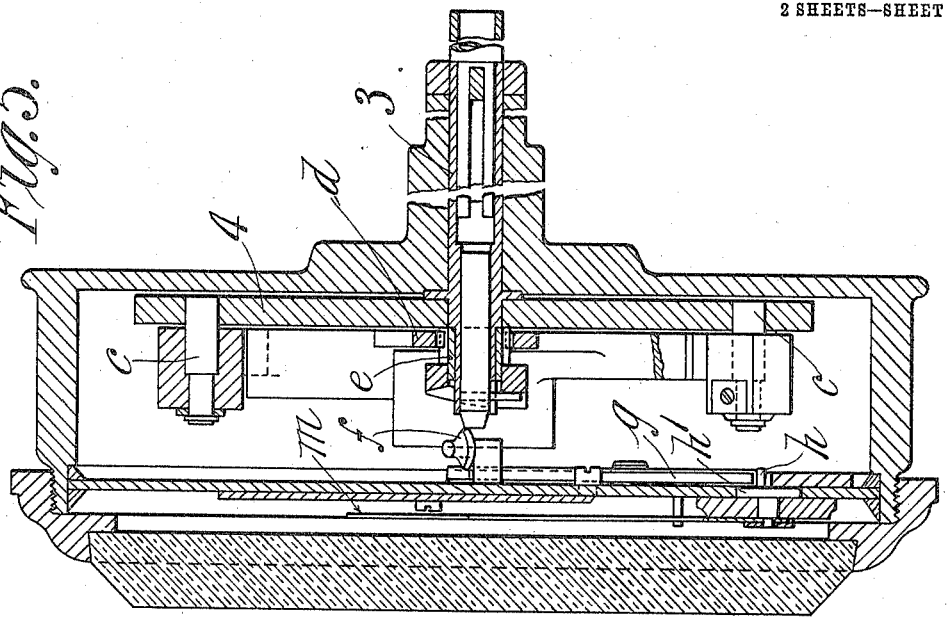
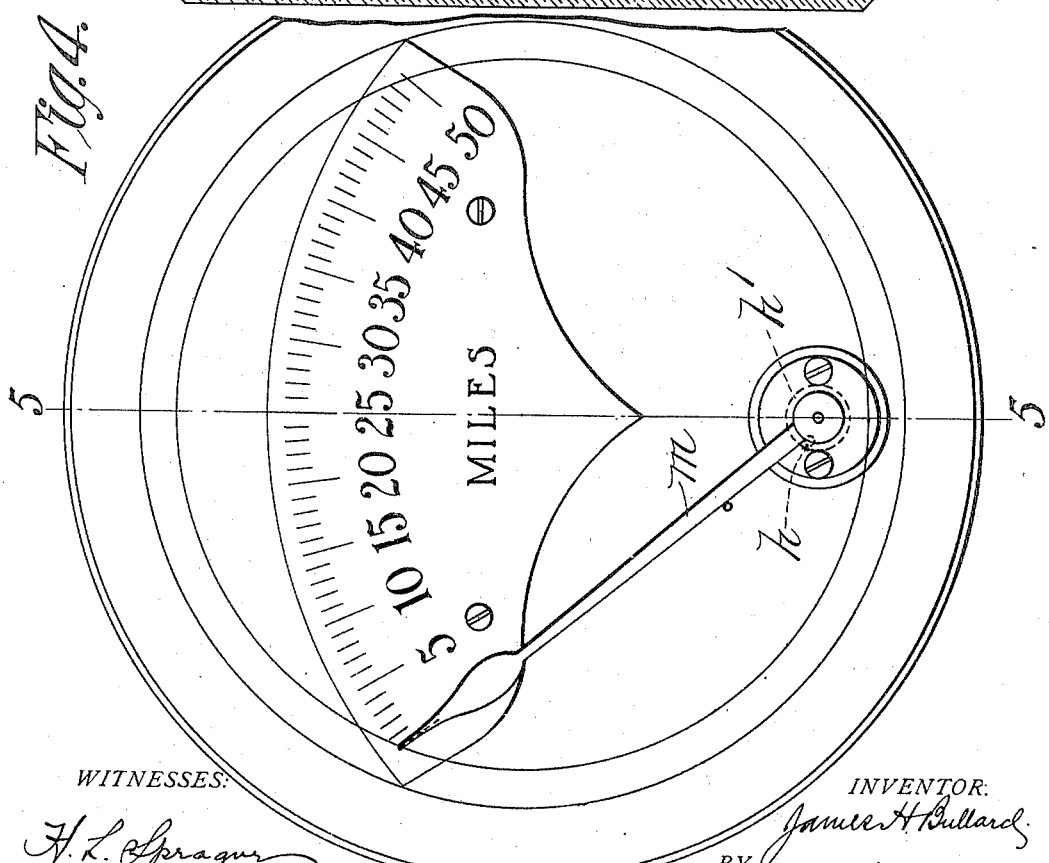
WITNESSES:
H. L. Sprague
Harry W. Bowen
INVENTOR:
James H. Bullard
BY
Chapin & Co.
ATTORNEYS.

UNITED STATES PATENT OFFICE.

JAMES H. BULLARD, OF SPRINGFIELD, MASSACHUSETTS.

SPEEDOMETER.

947,788.            Specification of Letters Patent.      Patented Feb. 1, 1910.

Application filed January 18, 1908. Serial No. 411,411.

*To all whom it may concern:*

Be it known that I, JAMES H. BULLARD, a citizen of the United States of America, residing at Springfield, in the county of Hampden and State of Massachusetts, have invented new and useful Improvements in Speedometers, of which the following is a specification.

This invention relates to speedometers and is in the nature of an improvement on the construction shown in the application for United States Letters Patent filed by James H., and Edwin W. Bullard on December 21, 1906 under Serial No. 348,904.

The general construction shown and described in said application is not changed, the object of the present invention being to provide a device which may be moved into operative relation to the speedometer mechanism, as desired, whereby when the indicating pointer swings over the face of the dial from zero forward, it may be positively held against any retrograde movement whatsoever, to the end that the pointer may remain stationary in that position which indicates the highest speed attained, the pointer swinging back to zero,—if the speedometer is not in operation when the device is moved out of operative relation to the mechanism thereof; or, if the speedometer is in operation, the pointer will swing back to the position on the scale showing the actual speed at the moment of shifting: that is to say, this device may be moved into or out of operative relation to the speedometer mechanism for the purpose stated, whether the speedometer is in operation or not; and the invention consists broadly in a movable stop which follows the forward movement of the pointer and blocks its return but is not actuated by the pointer or carried by it and therefore does not constitute a drag on the speedometer mechanism and can not affect the function of any part thereof at any speed to which the mechanism may be subjected.

The invention is clearly illustrated in the accompanying drawings, in which,—

Figure 1:
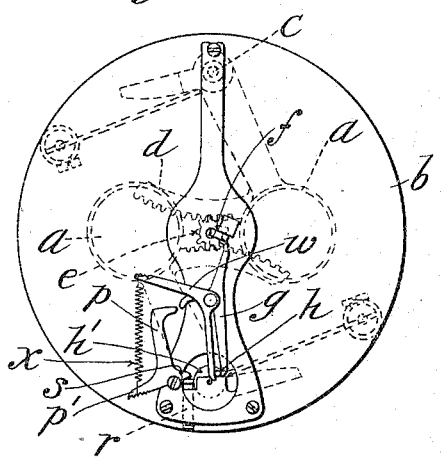
Figure 2:
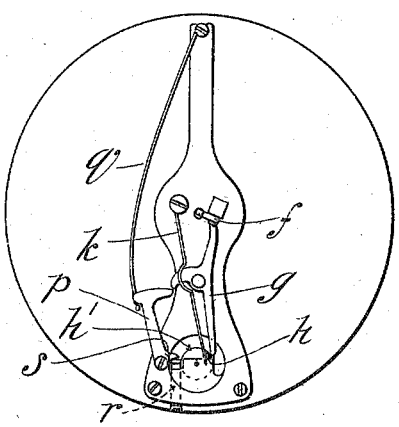
Figure 3:
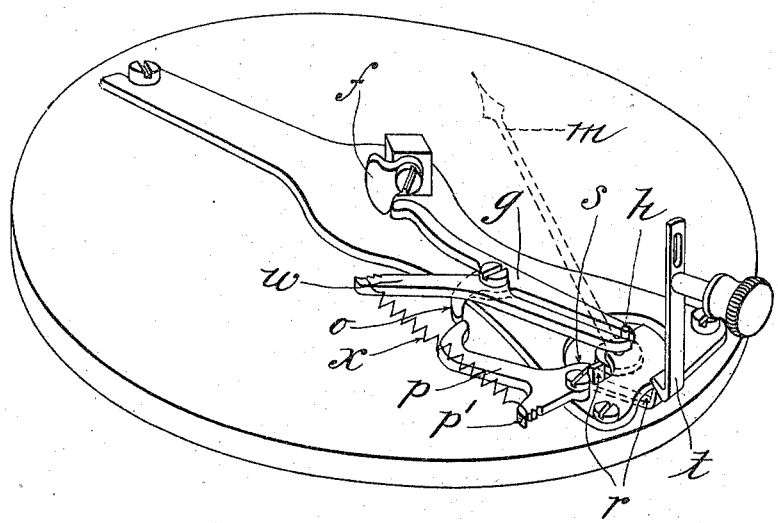

Figure 1 is a plan view of the back side of a dial plate of a speedometer, the position of the centrifugally actuated arms and of the pinion with which racks on the arms engage being shown in dotted lines, these arms, racks, and pinion, and the parts to impart swinging movement to the indicating pointer, being of the same construction as is shown in the said prior application of Bullard and Bullard. The construction shown in this Fig. 1 being the preferred construction for the reason that one spring only is employed. Fig. 2 is a like view to Fig. 1 but shows a slightly modified construction as to one part thereof. This construction necessitates, however, the use of the springs. Fig. 3 is a perspective view of the mechanism shown in Fig. 1, somewhat enlarged, and showing clearly the means whereby the stop-lever is moved into or out of operative relation to the speedometer mechanism. Fig. 4 is a plan view of the face or scale portion of the speedometer. Fig. 5 is a sectional elevational view on line 5—5, Fig. 4, showing a rotating plate member and the operating means actuated therefrom for moving the pointer, although the details of such means form no part of the present invention.

As in the said prior application, the centrifugally actuated arms $a$ are pivotally supported on a plate parallel to the plate $b$ at $c$, $c$, at opposite points thereon, and carried in a suitable casing, these arms having racks $d$ which engage opposite sides of a pinion $e$, the plate which is arranged parallel to the plate $b$ being connected with a shaft with which some rotating part is connected, as by a flexible shaft, whereby the rotation of this parallelly arranged plate will cause the arms $a$ to separate and thus rotate the pinion. This latter rotates a cam which, acting on another stationary cam-surface, imparts endwise movement to a shaft located axially of the plate, which shaft bearing on one end of the crank-arm $f$, the other arm of which bears on one end of and imparts swinging movement to a pivoted lever $g$ (see Figs. 1 and 2) the opposite end of which bears against a pin $h$ eccentrically placed on the hub $h^1$ of an indicating pointer, said pin being held against the lever $g$ by a spring $k$, Fig. 2, the spring in this figure being the same as shown in the said prior application; whereas in Fig. 1 there is only one spring used whose double function will be described further on. This, in brief, is the mechanism of the speedometer forming the subject matter of the above mentioned prior application of Bullard and Bullard, and it is recited here with sufficient fullness to make clear the function of the improvement forming the subject of the present application.

Coming now to the mechanism whereby the indicator pointer m (shown in dotted lines in Fig. 3) is prevented from swinging backward when the rotative velocity of the speedometer mechanism diminishes, it consists in its preferred form of the following parts: The lever g (whereby the pointer is indicated in the manner described) has at or near the axis thereof a laterally extending spur o, the end of which is curved downward; and mounted on the plate b, or on a piece secured thereon, is the arm p pivoted near its outer end to swing in substantially the same plane as the lever g. This arm p is L-shaped,—its short leg extending toward the end of the spur o,—and is so located that when permitted to move, said short leg of the arm will swing in under the end of said spur, as the latter swings through its curved path about the axis of the lever g. The edge of the fore end of the arm p is so curved that as the spur swings away from it, said curved end will follow the spur and be at all times in light contact therewith, said arm following in under the spur as far as permitted to do so by the position of the latter. It is therefore clear that should the weighted arms a, which actuate the lever g by their centrifugal movement, begin to swing back again toward the center of the revolving plate on which they are carried, the lever g can not follow them but being blocked by the arm p must remain in the position which will indicate the farthest point of its advance, the indicating pointer remaining stationary with it, the spring q (Fig. 2) serving to impart movement to the arm p and to hold it in blocking position under the spur o. The description of Fig. 1 will show the manner in which one spring may perform the function of both the springs k and q in Fig. 2.

From the foregoing, it is clear that to bring the arm p into operative relation to the speedometer mechanism, it is only necessary to leave it free to be moved by its actuating spring so that it may follow the movements of the lever g and swing in under the spur o thereon as far as permitted to do so, and the means for moving said arm p out of operative position consist in locating a loosely fitting slidable member r in a suitable recess in the plate b, the inner end of the slide being in position to bear on a projection s on the side of the arm p close to the pivotal point of the latter, and the other end of the slide extending out toward the edge of the plate (see Fig. 3) where it may be engaged by the sliding bar t located at right angles thereto, and whose lower end (which bears against the slide r) is beveled whereby endwise movement of said bar will impart endwise movement to the slide and thus serve to swing the inner end of the arm away from the spur o. While the means described for thus throwing the arm p into inoperative position is the construction preferred, other means for holding this arm in an inactive position may be substituted therefor, if desired.

The construction shown in Figs. 1 and 3, whereby one spring may perform the functions of the two springs k and q, consists in substituting for the spring k an elbow lever w pivoted on the same axis as lever g. One end of this elbow-lever extends down alongside of the lever g, and between the adjacent ends of the two levers is the pin or stud h eccentrically located on the hub of the indicating pointer m. The other arm of the lever w extends away from the axis of the latter over the spur o and beyond the upper end of the arm p. On the latter, near the axis thereof, is a rigid arm $p^1$ extending about at right angles to the body of the arm; and between said arm $p^1$ and the upper arm of said elbow lever w is subtended a spring x whose function is to hold one arm of the elbow lever yieldingly against the pin h and press the inner or free end of the arm p toward the axis of the lever g to move the upper end of said arm p under the spur o when permitted to do so, which will be when said arm is left free to swing by the withdrawal of the lever t or its equivalent, from the end of the slidable member r. In this manner the one spring x performs the functions of the two shown in Fig. 2 holding the pin h in a yielding grip and likewise swinging the arm p in under the spur o.

Referring briefly to Figs. 4 and 5 of the drawing, it will be observed that the flexible shaft which is connected to some portion of the vehicle is shown at 3 and is attached within the casing to the circular plate 4, which is located in parallel relation to the plate b and on which are pivotally mounted the rack-arms d that operate the pinion e whereby the lever g is operated, which moves the pointer as fully described in the prior application of James H., and Edwin W. Bullard previously referred to, and which forms no part of the present invention.

What I claim, is:—

1. The combination in a speedometer of the class described comprising a dial having a graduated scale thereon and a pivotally mounted indicating pointer to swing over said scale, of means actuated by a continuously rotating element of the device to move said pointer over the scale, said means including a crank-arm, and a member adapted to follow the movement of a member of the pointer-actuating mechanism in one direction, whereby upon a diminution of the speed of rotation of said continuously rotating member, said pointer will be restrained against retrograde movement.

2. The combination with the indicating pointer of a speedometer, of an actuating mechanism therefor to swing the pointer in one direction, a spring against the tension of which the pointer is moved, and a blocking device for the pointer to prevent its retrograde movement, said spring serving to hold the pointer against the blocking mechanism upon a diminution of power in the pointer-actuating mechanism, and means to move the blocking device into and out of operative relation to the pointer-actuating mechanism, independently of the position of the pointer.

3. A speedometer having in combination, a plate rotatably mounted, an indicating pointer operatively associated therewith, means actuated by centrifugal force for operating the pointer, means for locking the pointer against retrograde movement, and means for rendering said means inoperative.

4. A speedometer having in combination with a rotatably mounted plate, an indicating pointer operatively associated therewith, means actuated by centrifugal force for operating the pointer, means for locking the pointer against retrograde movement, and means for rendering said means inoperative, said means being manually operable.

5. A speedometer having in combination with a rotatable member, a pointer, means operably associated with the member for moving the pointer, said means being provided with a spur or projection, and means engaging the spur or projection to prevent return movement of the pointer.

6. A speedometer having in combination with a rotatable member, a pointer, means operable from the member for moving the pointer, said means being provided with a spur or projection, means engaging the spur or projection to prevent return movement of the pointer, and manually actuated means for throwing said spur-engaging means into and out of operation.

7. A speedometer having in combination with a rotatable member, a pointer, means for moving the pointer, said means being provided with a spur or projection, and means engaging the spur or projection to prevent return movement of the pointer, manually actuated means for throwing said spur-engaging means into and out of operation, said last mentioned means including a sliding element for engaging a shouldered portion on the first mentioned means.

JAMES H. BULLARD.

Witnesses:
K. I. CLEMONS,
HARRY W. BOWEN.